United States Patent [19]
Mohan

[11] Patent Number: 5,232,075
[45] Date of Patent: Aug. 3, 1993

[54] VISCOUS COUPLING APPARATUS WITH COINED PLATES

[75] Inventor: Sankar K. Mohan, Syracuse, N.Y.

[73] Assignee: New Venture Gear, Inc., Troy, Mich.

[21] Appl. No.: 891,417

[22] Filed: May 29, 1992

Related U.S. Application Data

[63] Continuation of Ser. No. 720,401, Jun. 25, 1991, Pat. No. 5,148,900.

[51] Int. Cl.⁵ .............................................. F16D 35/00
[52] U.S. Cl. ................................. 192/58 C; 192/70.14; 192/107 R
[58] Field of Search ...................... 192/58 C, 58 B, 57, 192/70.14, 107 M

[56] References Cited

U.S. PATENT DOCUMENTS

| | | | |
|---|---|---|---|
| 2,808,140 | 10/1957 | Trofimov | 192/57 |
| 4,932,509 | 6/1990 | Binder | 192/70.14 X |
| 4,989,687 | 2/1991 | Kwoka et al. | 192/58 C X |
| 5,007,515 | 4/1991 | Shimizu | 192/58 B X |
| 5,041,065 | 8/1991 | Kwoka | 192/58 C X |

FOREIGN PATENT DOCUMENTS

| | | | |
|---|---|---|---|
| 3627504 | 2/1988 | Fed. Rep. of Germany | 192/58 B |
| 3632283 | 2/1988 | Fed. Rep. of Germany. | |
| 3828421 | 3/1989 | Fed. Rep. of Germany. | |
| 0076932 | 3/1990 | Japan | 192/58 B |

Primary Examiner—Rodney H. Bonck
Attorney, Agent, or Firm—Harness, Dickey & Pierce

[57] ABSTRACT

A viscous coupling apparatus having enhanced torque progression characteristics. The viscous coupling apparatus includes two sets of viscous coupling plates which are interleaved and mounted with rotatable members for relative rotation therebetween. Each plate is a generally circular ring of thin plate material and has one or more openings formed therein. The openings include coined edge surfaces that form an inclined surface and a planar wiping surface. The coined edges facilitate the wiping and removal of viscous fluid from the surface of an adjacent coupling plate when relative rotation and frictional contact occurs between adjacent plates without generating excessive wear on one of the mating plates. The removal of the viscous fluid promotes enhanced frictional contact between the facing adjacent plate surfaces and results in an increased torque transmission characteristic.

13 Claims, 2 Drawing Sheets

VISCOUS COUPLING APPARATUS WITH COINED PLATES

This is a continuation of U.S. patent application Ser. No.07/720,401, filed Jun. 25, 1991, now U.S. Pat. No. 5,148,900.

BACKGROUND AND SUMMARY OF THE INVENTION

The present invnetion relates generally to a viscous coupling apparatus of the type used in motor vehicles and, more particularly, to an improvement in the viscous coupling plates utilized within the viscous coupling apparatus.

Viscous couplings are used in various applications within the drivetrain of a motor vehicle. In one typical application, a viscous coupling is located within the transfer case of a four-wheel drive vehicle to avoid tight corner braking by allowing slip to occur between the front and rear axles while concomitantly delivering torque to the wheel with traction. In another vehicular application, the viscous coupling is used in association with a differential to secure effective power delivery and improve traction, handling and stability. In still another application, the viscous coupling is a viscous transmission device that is located between the front and rear axles to provide "on-demand" four-wheel drive operation.

In general, viscous couplings include of a rotatable input member and a rotatable output member, both members being rotatable about a common axis. The output member is often in the form of a hub while the input member is a rotatable housing that is hermetically sealed around the hub so as to define a chamber therebetween. Alternately, the input and output arrangements could be reversed in other applications. Within the chamber are two sets of viscous coupling plates. The first set of plates, the inner viscous coupling plates, are splined to the hub and rotate therewith. Similarly, a second set of plates, the outer viscous coupling plates, are splined to the housing and rotate therewith. The outer plates are interleaved with the inner plates. Filling the chamber or space between the housing and the hub is a highly viscosity fluid, such as silicone oil, and, usually, a small amount of gas or air.

In operation, if a slight difference in rotational speed occurs between the input and output members, the relatively low shear rate occurring within the viscous fluid will permit relative slip to occur between the rotating members. However, as the speed differential increases, the viscous shear rate also increases and the fluid works to transmit torque from the input hub to the output housing. As so far described, such viscous couplings are well known in the motor vehicle field.

During initial operation of the viscous coupling, torque is primarily transmitted by the shearing forces resulting from relative rotation of the adjacent viscous coupling plates. However, if continuous relative rotation between the input and output members occurs over a period of time, a torque transmission phenomenon appears. This phenomenon is often referred to as torque progression or "humping". During such a torque progression, the amount of torque transmitted between the input and output members substantially increases without a corresponding increase in relative rotation. More particularly, if the rotational speed differential continues to exist, shearing of the viscous fluid will produce a temperature increase within the chamber. Concomitantly, the viscosity of the fluid decreases which, in turn, cause a predictable digression in the amount of torque being transmitted. However, as the fluid temperature continues to rise, the pressure within the sealed chamber increases for causing a number of the coupling plates to axially shift relative to the input and output members. As the pressure continues to increase, adjacent inner and outer plates are forced into mating or frictional contact with one another which results in torque being transferred by a frictional component in addition to the already present viscous shear component. Once frictional contact has been established between the plates, torque transmission is suddenly and significantly amplified producing the "humping" phenomenon stated above.

Because torque progression is partially caused by the surface to surface frictional contact of adjacent viscous coupling plates, the "humping" phenomenon can be enhanced if the contacting surfaces can be made reasonably free of the viscous fluid. To this end, the contacting surface of one viscous coupling plate can be "wiped" substantially free of the viscous fluid by the contacting surface of an adjacent viscous coupling plate.

Viscous coupling plates are generally manufactured via a stamping operation in which the plates are stamped from a thin sheet of plate material or stock. Invariably, a stamped viscous coupling plate exhibits die roll (i.e. a rounded edge) on one side of any openings formed in the plate and a fine uneven burr on the edges of the opposing side. This uneven burr is quickly worn from the plate surface under the frictional forces which produce the amplified torque progression. Unfortunately, once the uneven burr has been worn from the plate surface, the viscous fluid introduced onto the plate surfaces by the die roll can not be effectively wiped from the plate surfaces.

Conventionally, die roll has been eliminated on some viscous coupling plates by milling the openings or slots formed therein so as to grind off the die roll. Die roll has also been avoided by replacing the stamping process with laser cutting of the plates themselves. However, both of the above methods have not proven themselves to be cost effective and, in actuality, have proven to be difficult to duplicate and incorporate into a production setting. Another known method for providing a wiping edge is to bend the edge of the viscous clutch plate as disclosed in U.S. Pat. No. 4,989,687. However, such bent edges may produce an overly aggressive (i.e. sharp) wiping edge that causes excessive metal wear on the mating plates.

With the above discussion in mind, it is an object of the present invention to overcome the disadvantages associated with conventionally processed viscous coupling plates while enhancing the torque progression characteristics of the viscous coupling apparatus.

It is another object of this invention to manufacture a viscous coupling plate which is configured to substantially remove or "wipe" viscous fluid from the surface of an adjacent coupling plate and thereby enhances frictional contact of the adjacent plates without causing increased wear on the adjacent mating plate.

A further object of the present invention is to produce a viscous coupling plate having a raised "wiping" surface for removing viscous fluid from the planar surface of an adjacent coupling plate which is not readily susceptible to frictional wearing.

Another object of this invention is to produce a viscous coupling plate which exhibits the above advantages and objects and which is cost effective to produce.

In achieving the above objects, the present invention provides for a viscous coupling apparatus which exhibits enhanced torque progression characteristic's and which can be cost effectively produced. The viscous coupling plates of the present invention include raised wiping surfaces which are formed by coining the edges of the slots and/or openings formed in the plates. The coined edges define a planar plateau-like wiping surface that is adapted to exhibit increased frictional wearability. Fabrication of the coined edges is cost effective because the coining operation can be performed immediately after or during the stamping of the coupling plate without removal of the plate from the machine press or any other secondary operations.

Additional benefits and advantages of the present invention will become apparent to those skilled in the art to which this invention relates from the subsequent description of a preferred embodiment and the appended claims, taken in conjunction with the accompanying drawings.

DETAILED DESCRIPTION OF THE INVENTION

Figure 1:
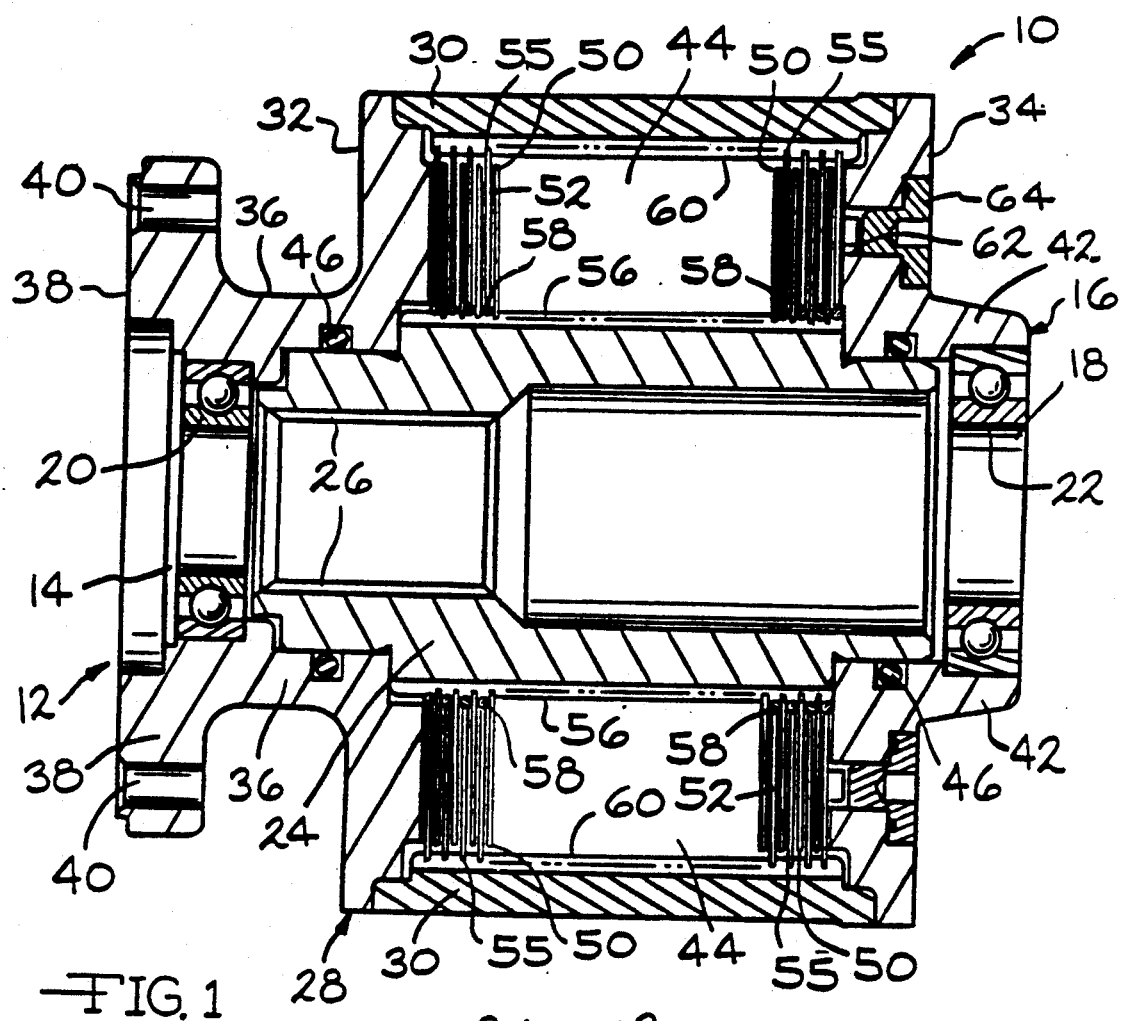
FIG. 1 is a sectional view of an exemplary viscous coupling apparatus having viscous coupling plates manufactured according to the principles of the present invention.

Referring now to the drawing, a viscous coupling apparatus is illustrated in FIG. 1 and is generally designated at 10. Viscous coupling apparatus 10 is merely exemplary of the type of device that can be utilized in conjunction with a four-wheel drive transfer case or other aspects of a vehicle's drivetrain, including the front and rear differentials, or as a viscous transmission for driving the rear or front axle.

Generally, viscous coupling 10 includes a forward end 12 having means for being fixedly coupled to an input shaft (not shown) which is driven by an output member of the motor vehicle transmission or transfer case. Similarly, an aft end 16 of viscous coupling 10 is provided with an opening 18 for receiving an output shaft (not shown) which is directed to one set of the vehicle's drive wheels (not shown). The output shaft is journally supported for rotation in first and second bearing assemblies 20 and 22, respectively. An elongated hub 24 is shown to concentrically surround an end portion of the output shaft and is adapted to be fixedly engaged with the output shaft so as to rotate therewith. More specifically, hub 24 is coupled for rotation with the output shaft through splines 26 interiorly formed thereon.

A rotatable drum housing assembly 28 encircles hub 24 and generally includes a cylindrical outer drum 30 which is fixedly connected to a forward cover plate 32 and an aft cover plate 34. Forward cover plate 32 includes a generally cylindrical axial extension 36 which terminates in a radial flange 38 to which the input shaft is connected. To facilitate attachment of the input shaft, radial flange 38 includes mounting bores 40 through which threaded fasteners or the like may be extended. First bearing assembly 20, which supports the forward-most end portion of the output shaft, is journaled within an internal portion of the axial extension 36 of forward cover plate 32. Similarly, second bearing assembly 22 is journaled within an internal portion of a generally axial extension 42 of aft cover plate 34. So constructed, drum housing assembly 28 and hub 24 are capable of rotating relative to one another.

Drum housing assembly 28 encloses elongated hub 24 with the inner surfaces of outer drum 30 and forward and aft cover plates 32 and 34, respectively, defining an internal chamber 44. Chamber 44 is hermetically sealed around hub 24 by fore and aft seals 46. Disposed within chamber 44 are two sets of interleaved viscous coupling plates, cumulatively designated as 48, which substantially fill chamber 44. One set of plates, hereinafter referred to as inner plates 50, are mounted for rotation with hub 24 while the second set of plates, hereinafter referred to as outer plates 52, are mounted for rotation with outer drum 30.

Figure 2:
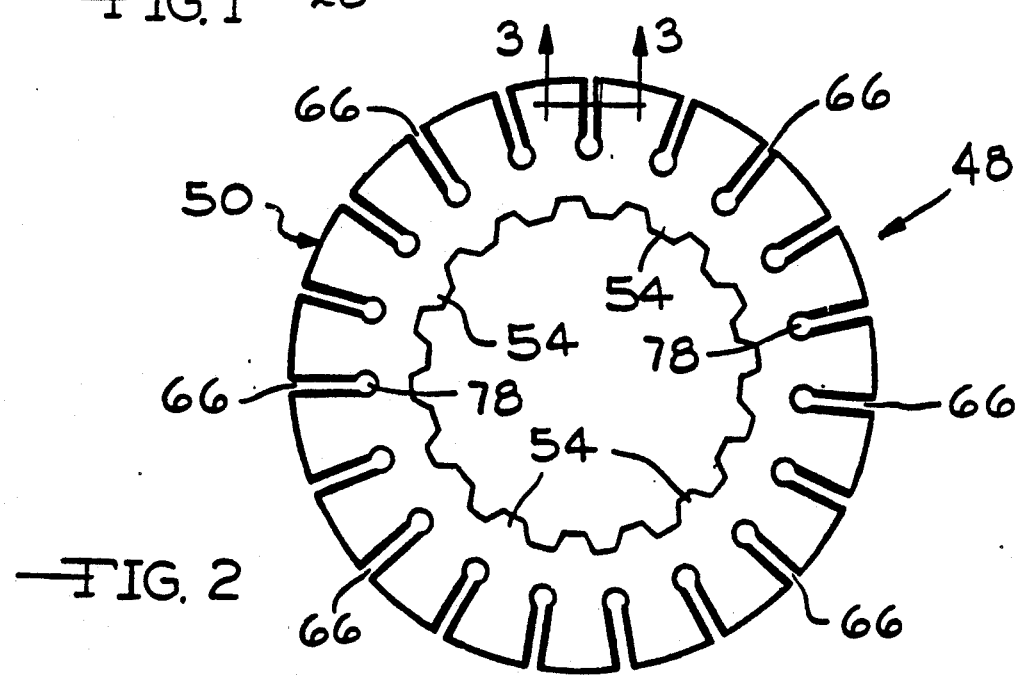
FIG. 2 is a plan view of one of the viscous coupling plates utilized in the viscous coupling apparatus of FIG. 1.

In general, viscous coupling plates 48 are formed from relatively thin plate stock and are generally ring-shaped. As shown in FIG. 2, each inner plate 50 includes spline teeth 54 formed along its inner circumference which are configured to meshingly engage axial splines 56 formed on the exterior surface of hub 24. Inner plates 50 are positioned in a spaced relationship and are so maintained by spacer rings 58. Outer plates 52 are mounted to outer drum 30 via external spline teeth 55 formed around the outer circumference of outer plates 52. In particular, spline teeth 55 meshingly engage axial splines 60 formed interiorly of outer drum 30. In the exemplary viscous coupling apparatus shown, spacer rings 58 are not used with outer plates 52 and thus allow axial movement of outer plates 52 between adjacent inner plates 50 along splines 60. However, in an alternative embodiment, outer plates 52 may be axially spaced by spacer rings 58 and fixed relative to outer drum 30 while inner plates 50 are axially movable therebetween along hub 24.

Chamber 44 is substantially filled, typically 90% or greater, with a viscous fluid such as silicone oil, the remaining volume of chamber 44 being filled with air or some other inert gas. To facilitate filling of chamber 44, aft cover plate 34 is provided with a fill port 62 and fill plug 64.

During operation of viscous coupling apparatus 10, the input shaft will be driven by the vehicle's source of power of transmission for causing drum housing assembly 28 and outer plates 52 to rotate. Generally, hub 24 and inner plates 50 will be rotating under substantially similar conditions (i.e. the vehicle is traveling on dry pavement with drum housing assembly 28 rotating with the front wheels while hub 24 is rotating with the rear wheels). Where the conditions involve a slight differential in rotational speeds between hub 24 and housing 28, the fluid will permit viscous shearing and accommodate the rotational difference by allowing slip. However, as the rotational speed differential and viscous shearing rate increase, the apparent viscosity of the fluid will decrease which results in a softening of the fluid. However, this softening is more than offset by the increase in shear torque generated by the increase in speed and, as the viscous shearing rate increase, viscous coupling 10 becomes increasingly rigid thereby transmitting an increased amount of torque.

If a substantially continuous speed differential is maintained over a period of time, the temperature within chamber 44 will begin to increase causing the viscous fluid to expand. Since the fluid will expand at a rate greater than that of chamber 44, the internal pressure of chamber 44 will rise. During the rise in chamber pressure, the gas or air contained within chamber 44 dissolves into the silicone oil. This change in the distribution of air acts to modify its flow patterns and will allow for the development of pressure differentials. In response to the pressure differentials, the axially movable plates (i.e. outer plates 52 in the illustrated embodiment) will axially shift and establish frictional contact with an adjacent non-movable plate (i.e. inner plate 50). With the establishment of frictional contact between inner and outer plates 50 and 52, respectively, a sudden and sharp increase in transmitted torque occurs without a corresponding increase in differential rotational speed. This is referred to as the "humping" phenomenon or torque progression. As is known, the axial movement of outer plates 52 relative to outer drum 30 is promoted by radially extending slots 66 and/or other openings 78 being provided in plates 48 to facilitate the development of the pressure differentials.

Figure 4:
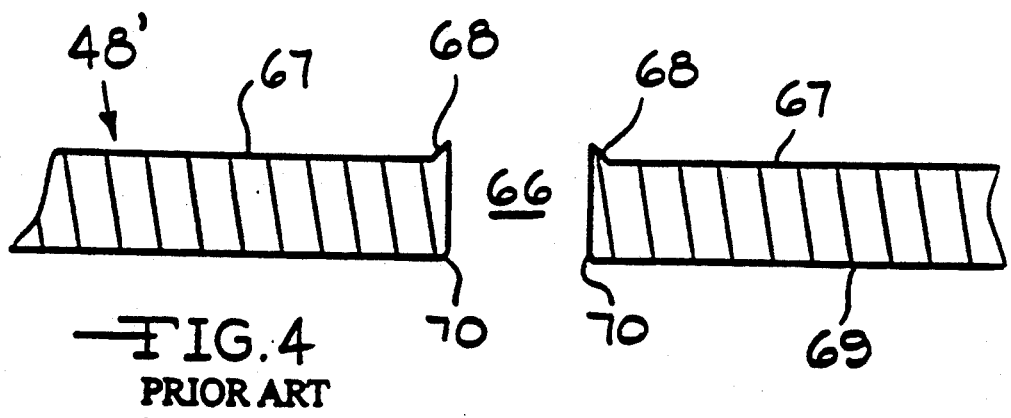
FIG. 4 is a partial sectional view showing the burr and die roll associated with a conventional stamped viscous coupling plate.

Prior to discussion of the improvements in viscous coupling plates 48 associated with the present invention, a brief summary of conventionally processed plates is warranted. For purposes of clarity, conventionally processed viscous coupling plates, shown in FIGS. 4 through 6, will be identified as 48'. Typically, viscous coupling plates 48' are stamped from plate stock in a machine press utilizing male and female dies. As seen in FIG. 4, the stamping operation produces an uneven fine burr 68 along the edges of one plate surface or face 67 and a rolled edge 70 along the edges of the opposing face 69. Uneven burr 68 results from shearing the plate stock and rolled edge 70 is a result of die roll.

During the frictional contact of torque progression, fine burr 68 wipes an amount of viscous fluid from the frictionally contacting surfaces of the adjacent viscous coupling plate 48' and assists in establishing frictional contact and torque progression. However, fine burrs 68 are generally unevenly formed so as to provide a non-uniform wiping edge and, in addition, are quickly worn off due to inter-plate frictional contact. Without the clearing or wiping action provided by fine burr 68, frictional contact is limited since rolled edges 70 assist in introducing additional viscous fluid between the facing surfaces of adjacent viscous coupling plate 48'.

Figure 5:
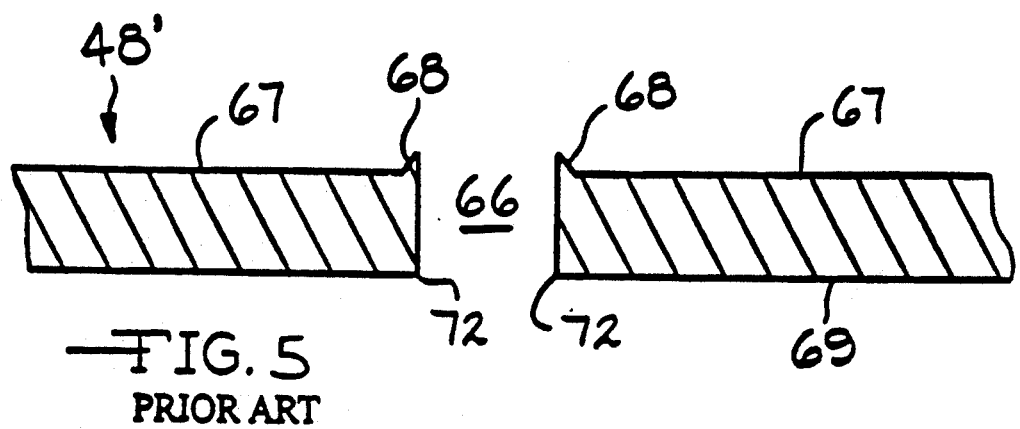
FIG. 5 is a partial sectional view of a conventional stamped viscous coupling plate having milled edges for eliminating die roll.
Figure 6:
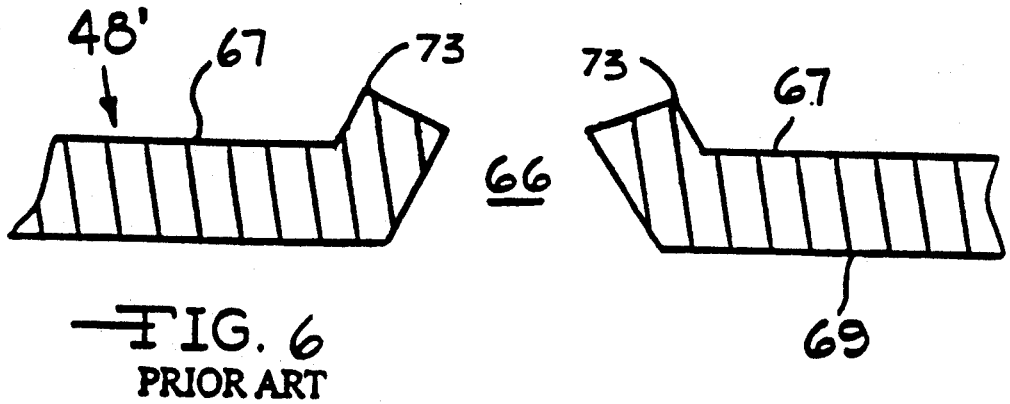
FIG. 6 is a partial sectional view of a conventional stamped viscous coupling plate formed with bent edges for defining a sharp wiping edge.

One method of removing rolled edges 70 from along slots 66 is to mill slots 66 in a secondary machining operation. A milled edge contour is illustrated in FIG. 5. While rolled edge 70 is machined off by the milling operation to produce a relatively squared corner 72, milling burr 68 is still quickly worn off during frictional contact with the adjacent plate. Furthermore, the milling procedure has proven difficult and costly to incorporate into a repeatable production setting. Another method of avoiding formation of the uneven burr would be to bend the entire edge of slot 66 as is shown in FIG. 6. This method produces a substantially even wiping edge surface having an extremely sharp contact point 73. However, the sharp wiping edge may be overly aggressive during wiping action whereby undesirable excessive wear may occur on the mating plate.

Figure 3:
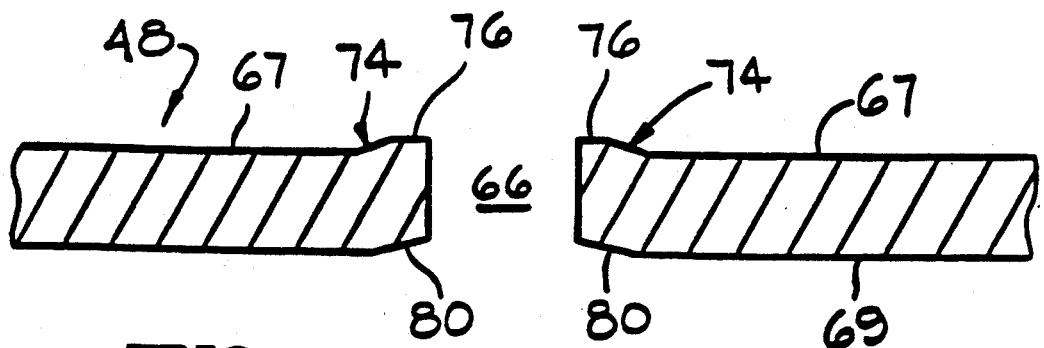
FIG. 3 is a sectional view taken substantially along line 3—3 in FIG. 2 illustrating the raised "wiping" surfaces formed on the viscous coupling plate after coining.

As seen in FIG. 3, viscous coupling plates 48 of the present invention include complimentary "ramped" or raised surfaces 74 which terminate adjacent slot 66 in a substantially flat plateau regions 76. Plateau regions 76 of raised surfaces 74 are configured to include an increased width for avoiding the excessively aggressive wiping action associated with sharp edges and, therefore, are not readily susceptible to frictional wear. Similarly, raised surfaces 74 do not cause excessive wear on the adjacent frictionally engageable plate. If desired, a recessed surfaces 80, located adjacent slot 66, may be formed opposite of raised surfaces 74. Recessed surfaces 80 do not produce the problems associated with rolled edges 70 because, unlike uneven burrs 68, raised surfaces 74 are not readily worn away from the surface of the viscous coupling plates 48. Another feature of the present invention is the long wearing characteristics of viscous coupling plates 48 in that any surface wear causes the plateau region 76 to increase in width to provide a progressively larger wiping area.

To produce raised surfaces 74, the areas adjacent to slots 66 of viscous coupling plates 48 are coined after or during the initial stamping operation. As such, coined surfaces 74 can be readily produced without removing the initially stamped plates from the machine press itself. In particular, the male die utilized during the initial stamping of the viscous coupling plates is replaced with or is modified to include a coining die such that the edges adjacent to slots 66 are coined without removing the initially formed plate 48 from the female stamping die. Thus, viscous coupling plates 48 can be easily and economically fabricated in a high volume production application.

As stated above, if the differential rotational speeds continue to occur, inner and outer plates 50 and 52, respectively, come into frictional contact as a result of the pressure increase within chamber 44. During frictional contact, the planar surface on plateau regions 76 matingly engage the planar surface of the adjacent viscous coupling plate for producing a wiping action that is operable to effectively remove a significant amount of viscous fluid therefrom. By removing the viscous fluid between the adjacent surfaces of contacting plates 50 and 52, frictional contact is thereby enhanced and increased torque transfer is promoted.

As seen, coined or raised surfaces 74 are provided with the planar plateau portions 76 located immediately adjacent to slots 66. The planar surface of plateau portions 76 provides for a greater surface area which will contact and wipe against the surface of the adjacent viscous coupling plate and, thus, increase the wiping capabilities of coined surface 74 without causing excessive wear on the mating plates. In addition, it is preferable that planar surface on plateau portion 76 be oriented in a plane that is substantial parallel to each of opposing faces 67 and 69.

At their radial most ends (inward on inner plates 50 and outward on outer plates 52), slots 66 terminate in circular openings 78. Openings 78 are provided, in part, to relieve the stresses involved with the coining of raised surfaces 74. While coined surfaces 74 are illustrated in FIG. 2 as being formed on an inner plate 50, it will be appreciated that coined surfaces may also be formed along slots 66 formed in outer plates 52. Furthermore, coined surfaces 74 may be formed along any edge which defines an opening in coupling plates 48. However, the generally radial orientation shown produces the most significant wiping action in that it is provided normally to the rotational direction of plates 50 and 52.

While the above description constitutes the preferred embodiments of the present invention. it will be appreciated that the invention is susceptible to modification, variation and change without departing from the proper scope and fair meaning of the accompanying claims.

What is claimed is:

1. A plate for use in a viscous coupling comprising a generally planar ring having inner and outer peripheries and an opening formed therein, portions of said ring located adjacent to opposite edge surfaces of said opening being deformed out of the general plane of said ring for providing a pair of offset portions which define oppositely inclined planar ramped surfaces, each of said ramped surfaces terminating in a planar wiping surface formed contiguous to its respective opening edge surface and which is substantially parallel to the general plane of said ring, each of said offset portions having a recessed surface formed opposite at least one of said ramped surface and said wiping surface.

2. The plate of claim 1 wherein said opening is a plurality of laterally spaced slots which extend radially at least partly across said ring.

3. The plate of claim 2 wherein said slots are open at one of said inner and outer peripheries.

4. The plate of claim 1 wherein each said offset portion includes a bottom surface substantially parallel to one of said ramped surfaces.

5. A plate for use in a viscous coupling comprising a ring having an upper surface, a lower surface, inner and outer peripheries and a plurality of slots extending at least partly across a dimension of said ring defined between said peripheries, said ring having a generally planar web portion between each adjacent pair of slots and a pair of offset portions formed at opposite ends of said web portion and which are each located adjacent to an edge surface of one of said slots, each of said offset portions having a first planar ramped surface formed in said upper surface which terminates in an elongated wiping surface, said elongated wiping surface extending to said edge surface of said slot and being oriented in a plane so as to be substantially parallel to said planar web portion of said ring, each of said offset portions including a second ramped surface formed in said lower surface which is arranged to be generally opposite to said first ramped surface.

6. The plate of claim 5 wherein said slots extend radially at least partly across said ring.

7. The plate of claim 6 wherein said slots are open at one of said inner and outer peripheries.

8. The plate of claim 5 wherein said first ramped surfaces associated with said pair of offset portions are oppositely inclined relative to said planar web portion.

9. The plate of claim 5 wherein each said offset portion includes a bottom surface substantially parallel to one of said ramped surfaces.

10. A viscous coupling apparatus comprising a hub adapted for rotation about an axis, a housing enclosing said hub for defining a chamber, said housing adapted for rotation relative to said hub about said axis, two sets of interleaved annular plates in said chamber with a first set of said plates being rotatable with said hub and a second set of said plates being rotatable with said housing, one of said first and second sets being axially movable relative to its corresponding one of said hub and said housing and being capable of frictionally contacting the other of said first and second sets, a viscous fluid disposed within said chamber and substantially immersing said plates, and wherein each of said plates of one of said first and second sets comprises a generally planar ring having inner and outer peripheries and a plurality of slots formed therein, portions of said ring located adjacent to opposite edge surfaces of each of said slots being deformed out of the general plane of said ring for providing a pair of offset portions which define oppositely inclined planar ramped surfaces relative to the general plane of said ring, each of said ramped surfaces terminating in a planar wiping surface formed contiguous to its respective slot edge surface and which extends in a plane that is substantially parallel to the general plane of said ring, each of said offset portions having a recessed surface formed opposite at least one of said ramped surface and said wiping surface.

11. The viscous coupling apparatus of claim 10 wherein said slots are equally spaced and extend radially at least partly across said ring.

12. The viscous coupling apparatus of claim 11 wherein said slots are open at one of said inner and outer peripheries.

13. The viscous coupling apparatus of claim 10 wherein each said offset portion includes a bottom surface substantially parallel to one of said ramped surfaces.

* * * * *